United States Patent
Oh et al.

(10) Patent No.: US 6,489,959 B1
(45) Date of Patent: Dec. 3, 2002

(54) METHOD FOR CONVERTING THREE-DIMENSIONAL POLYGON DATA INTO QUAD EDGE DATA STRUCTURE

(76) Inventors: Kwang-Man Oh, Chungsol APT 514-603 Songkang-Dong, Yusung-Gu, Taejon (KR); Kyung Jun Song, Hanmaul APT 200-4 Songkang-Dong, Yusung-Gu, Taejon (KR); Kwang-Hyun Shim, Hanaro APT 101-905 Wolpyung 3-Dong, Seo-Gu, Taejon (KR); Kwang Ho Yang, Hanbit APT 126-1005 Auen-Dong, Yusung-Gu, Taejon (KR); Byoung Tae Choi, Hanbit APT 129-608 Auen-Dong, Yusung-Gu, Taejon (KR); Jong Sung Kim, Hanaro APT 109-806 Wolpyung 3-Dong, Seo-Gu, Taejon (KR); Byung Eui Min, Chungku-Narae APT 107-203 Junmin-Dong, Yusung-Gu, Taejon (KR)

( * ) Notice: Subject to any disclaimer, the term of this patent is extended or adjusted under 35 U.S.C. 154(b) by 0 days.

(21) Appl. No.: 09/439,180
(22) Filed: Nov. 12, 1999

(30) Foreign Application Priority Data

Dec. 11, 1998  (KR) ............................................. 98-54450

(51) Int. Cl.$^7$ ............................................... G06T 17/20
(52) U.S. Cl. ....................................... 345/423; 345/420
(58) Field of Search ................................ 345/423, 420; 433/24

(56) References Cited

U.S. PATENT DOCUMENTS 4,736,306 A    4/1988  Christensen et al. ........ 364/513
4,987,554 A    1/1991  Kaufman ..................... 364/522
6,227,850 B1 *  5/2001  Chishti et al. ................. 433/24

OTHER PUBLICATIONS

Oh, Kwang M., "An Efficient Quad Edge Conversion of Polygonal Manifold Objects," *MIT Team, Multimedia section of Computer and Software Technology Lab., Electronics and Telecommunications Research Institute (ETRI)*, South Korea.

Guibas, Leonidas et al., "Primitives for the Manipulation of General Subdivisions and the Computation of Voronoi Diagrams," *ACM Transactions on Graphics*, vol. 4, No. 2, Apr. 1985, pp. 74–122.

Lischinski, Dani, "Incremental Delaunay Triangulation," 1994.

* cited by examiner

*Primary Examiner*—Mark Zimmerman
*Assistant Examiner*—Lance W. Sealey

(57) ABSTRACT

A method for converting OFF (object file format) from three-dimensional polygon data into a quad edge data structure which includes a step to determine if an input triangle of object file format is a whole new triangle, a step to find two edges and perform splice operation if the input triangle is a whole new triangle in the determination step, a step to find a quad edge from vertex link of quad edge data structure if the input triangle is not a whole new triangle in the determination step, and a step to find a candidate edge for a splice operation by comparing the link generated in the preprocessing stage and the vertex link of quad edge data structure and performing the splice operation on the candidate edge and the new quad edge.

2 Claims, 2 Drawing Sheets

(a) WHOLE-NEW-TRIANGLE  (b) PARTLY-NEW-TRIANGLE

METHOD FOR CONVERTING THREE-DIMENSIONAL POLYGON DATA INTO QUAD EDGE DATA STRUCTURE

TECHNICAL FIELD OF THE INVENTION

The present invention relates to a method for converting OFF (object file format) from three-dimensional polygon data into quad edge data structure.

BACKGROUND OF THE INVENTION

Generally, typical shapes of data in computer graphics are three-dimensional polygons or triangles.

Three-dimensional polygons and triangles are displayed on a computer screen through a rendering process, which requires an efficient algorithm.

Three-dimensional polygon data are generated, modified, or added in application areas such as rendering, virtual reality, and animation.

To perform such operations efficiently, various data structures have been proposed, and quad edge data structure is one of them.

Quad edge data structure is an edge-based data structure and is able to describe graph and dual graph at the same time. In addition, quad edge data structure employs a splice operator, which is a topological operator.

Even though quad edge is a sufficient data structure for its purposes, an efficient method converting conventional data structure into quad edge data structure has not been discovered.

SUMMARY OF THE INVENTION

A method for converting OFF (object file format) of three-dimensional polygon data into a quad edge data structure is provided.

The method in accordance with an embodiment of the present invention includes the following steps. A first step is to determine if an input triangle in object file format is a whole new triangle. An additional step is to find two edges and perform a splice operation if the input triangle is a whole new triangle in the determination step. The two edges are connected with a vertex. A step is to find a quad edge from a vertex link of the quad edge data structure if the input triangle is not a whole new triangle in the determination step. The vertex link has a counterclockwise sequence. A further step is to find a candidate edge for a splice operation by comparing the link generated in the preprocessing stage and the vertex link of the quad edge data structure and performing the splice operation on the candidate edge and a new quad edge.

The method implemented in a computer system in accordance with an embodiment of the present invention includes the following steps. A first step is to determine if an input triangle of object file format is a whole new triangle. An additional step is to find two edges and perform a splice operation if the input triangle is a whole new triangle in the determination step. The two edges are connected with a vertex. A further step is to find a quad edge from a vertex link of the quad edge data structure if the input triangle is not a whole new triangle in the determination step. The vertex link has a counterclockwise sequence. Another additional step is to find a candidate edge for a splice operation by comparing the link generated in the preprocessing stage and the vertex link of the quad edge data structure and performing the splice operation on the candidate edge and a new quad edge.

BRIEF DESCRIPTION OF THE DRAWINGS

The embodiments of the present invention will be explained with reference to the accompanying drawings, in which.

DETAILED DESCRIPTION OF THE INVENTION

Figure 1:
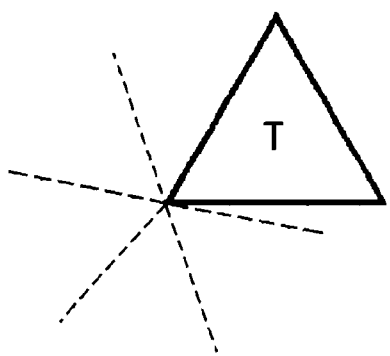
FIG. 1a is a diagram illustrating a whole new triangle.
FIG. 1b is a diagram illustrating a partly new triangle.
Figure 1:
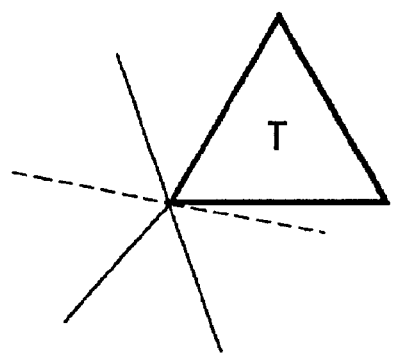

The present invention includes a method for converting three-dimensional polygon data that is given as a form of OFF (object file format) into a quad edge data structure.

The method is needed to efficiently manipulate three-dimensional data, which is derived from a modeling system or a three-dimensional object generator, such as scanners.

When three-dimensional polygon data includes polygons other than triangles, the polygons are converted into a group of triangles through triangulation.

In an embodiment of the present invention, it is assumed that all three-dimensional polygon data are formed by a group of triangles.

The quad edge structure employs four directed edges to describe an undirected edge.

A directed edge has a starting vertex and a destination vertex and therefore has direction.

Where a directed edge is moving with certain direction, a plane located at the left side of the directed edge becomes the left face. Likewise, a plane located at the right side of the directed edge becomes the right face.

In order to apply a splice operation, directed edges that are used as operands for the splice operation should have the same starting vertex and the same left face.

Faces and vertices of converted triangles are internally managed as a form of a CCW (counterclockwise) edge ring in the quad edge data structure.

Therefore, there are two types of edge rings. One is the face edge ring and the other is the vertex edge ring.

Face edge rings connect edges that form the same face with a counterclockwise sequence, and vertex edge rings connect edges that share a vertex as the starting vertex with a counterclockwise sequence.

A method for converting three-dimensional polygon data that is given as a form of OFF (object file format) into quad edge data structure in accordance with the present invention is as follows.

(1) Triangles are processed one by one.

(2) The unit for triangle processing is an edge. Two edges connected with each vertex are discovered and then the two edges are applied to a splice operation.

(3) Every triangle is categorized into two types by the sequence of the processing. That is, every triangle is categorized into a "whole new triangle" or a "partly new triangle". If a triangle shares an edge or a vertex with triangles that are already converted into a quad edge structure, the triangle is a "partly new triangle".

(4) Whole new triangles do not share an edge or a vertex with triangles that are already converted into the quad edge structure.

(5) Partly new triangles share an edge or a vertex with triangles that are already converted into a quad edge structure.

(6) Each vertex of whole new triangles only has two edges.

(7) Each vertex of partly new triangles has more than three edges.

(8) A candidate edge may be found in order to perform a splice operation on a vertex shared in a partly new triangle. The candidate edge is an edge that shares the same left face with an edge to be converted among edges of triangles that are already converted into a quad edge structure.

(9) Since an edge that is newly converted into a quad edge is inserted into an existing edge ring, an edge of the same left face becomes the previous edge that is immediately before the edge to be inserted. Because the newly-converted edge divides the left face of the previous edge into two parts, the previous edge and the newly-converted edge share the same left face.

(10) The issue to find a candidate edge now turns into the issue to find the previous edge of the newly converted edge in an edge ring.

(11) Since the newly-converted edge is not included in the vertex edge ring, candidate edge rings cannot be found on the basis of the vertex edge ring.

(12) Necessary information to find a solution for the issue to find the previous edge of the newly-converted edge in an edge ring is generated from the given triangle data in advance.

(13) Necessary information is generated as follows. At every vertex of the triangles, all triangles connected with the vertex are obtained. Edges of the obtained triangles are gathered. Then, overlapped edges are removed. A link of counterclockwise sequence is formed from the remaining edges in a preprocessing stage.

(14) A candidate edge is obtained by comparison between the link of the counterclockwise sequence and the vertex edge ring of the quad edge.

(15) A splice operation is performed on the basis of the candidate edge.

Then, the edge that has a vertex shared at the partly new triangle as a starting vertex is converted into a quad edge data structure.

DETAILED DESCRIPTION OF THE DRAWINGS

FIG. 1a is a diagram illustrating a whole new triangle.

FIG. 1b is a diagram illustrating a partly new triangle.

Solid lines in FIG. 1 describe edges of triangles that are already converted. Dotted lines describe edges of triangles that are to be converted. Thick solid lines describe edges of triangles that are converting.

Shown in FIG. 1, a triangle is categorized into "whole new triangle" or "partly new triangle". If a triangle shares an edge or a vertex with triangles that is already converted into a quad edge structure, the triangle is a "partly new triangle".

Whole new triangles don't share an edge or a vertex with triangles that are already converted into a quad edge structure.

Each vertex of whole new triangles only has two edges.

Each vertex of partly new triangles has more than three edges.

A candidate edge may be found in order to perform a splice operation on a vertex shared in a partly new triangle. The candidate edge is an edge that shares a same left face with an edge to be converted among edges of triangles that are already converted into the quad edge structure.

That is, the candidate edge is an edge that shares the same left face with an edge to be converted in the vertex edge ring.

Figure 2:
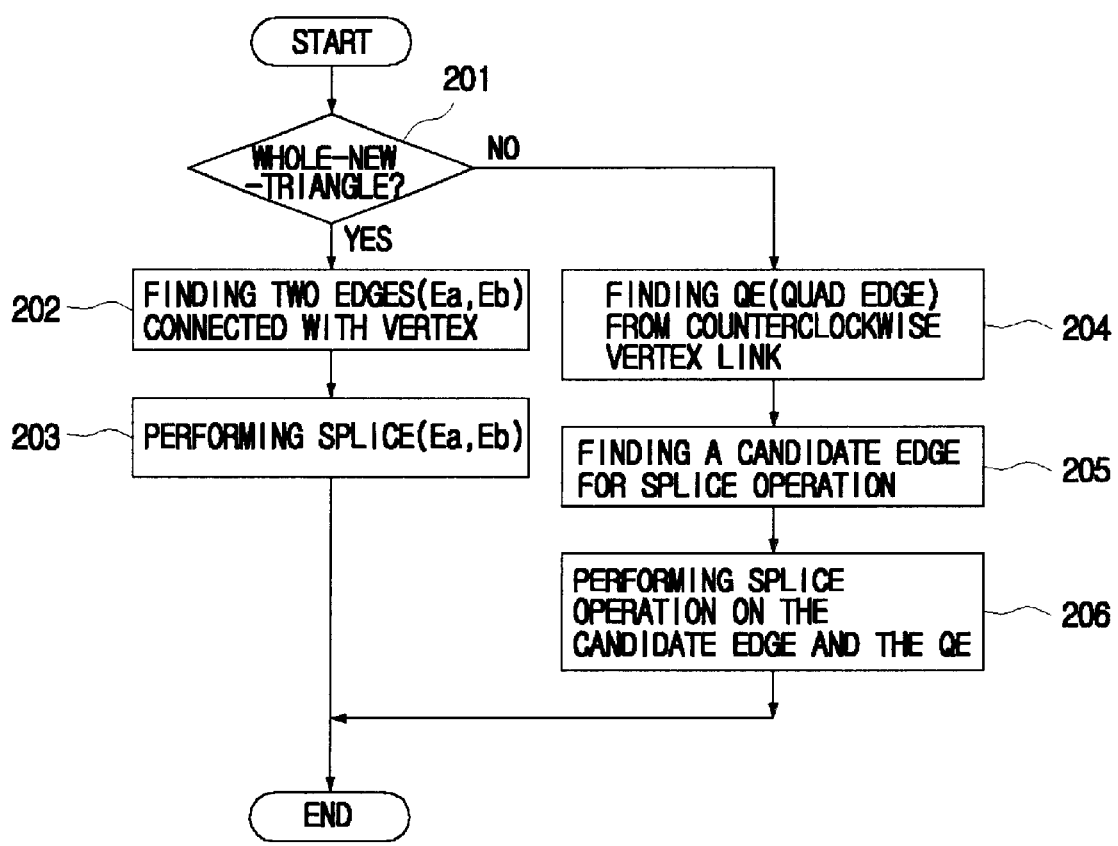
FIG. 2 is a flow diagram illustrating a method for converting three-dimensional polygon data into a quad edge data structure in accordance with an embodiment of the present invention.

FIG. 2 is a flow diagram illustrating a method for converting three-dimensional polygon data into the quad edge data structure in accordance with an embodiment of the present invention.

As shown in FIG. 2, first of all, the method determines if a triangle of OFF (object file format) is a whole new triangle at step 201 and the test is applied to all triangles.

If the triangle is a whole new triangle, two edges that are connected with a vertex are found at step 202 and the splice operation is performed at step 203.

If the triangle is not a whole new triangle, a quad edge is found in a vertex link of counterclockwise sequence at step 204.

Then, a candidate edge is found by comparing the link generated in the preprocessing stage and the vertex link of the quad edge data structure at step 205. The splice operation is applied to the candidate edge and the new quad edge.

Conventional objects are converted into graphics objects by employing the method of the present invention and therefore conventional polygon data is processed efficiently.

Although representative embodiments of the present invention have been disclosed for illustrative purposes, those who are skilled in the art will appreciate that various modifications, additions and substitutions are possible without departing from the scope and spirit of the present invention as defined in the accompanying claims.

What is claimed is:

1. A method for use in converting three-dimensional polygon data of object file format into a quad edge data structure, comprising:

determining if an input triangle of object file format is a whole new triangle finding two edges and performing a splice operation if the input triangle is a whole new triangle in the determination step, the two edges being connected with a vertex;

finding a quad edge from a vertex link of the quad edge data structure if the input triangle is not a whole new triangle in the determination step, the vertex link having a counterclockwise sequence; and finding a candidate edge for the splice operation by comparing the link generated in the preprocessing stage and the vertex link of the quad edge data structure and performing a splice operation on the candidate edge and the new quad edge.

2. A method implemented in a computer system for use in converting three-dimensional polygon data of object file format into a quad edge data structure, comprising:

determining if an input triangle of object file format is a whole new triangle finding two edges and performing a splice operation if the input triangle is a whole new triangle in the determination step, the two edges being connected with a vertex;

finding a quad edge from a vertex link of the quad edge data structure if the input triangle is not a whole new triangle in the determination step, the vertex link having a counterclockwise sequence; and finding a candidate edge for a splice operation by comparing the link generated in the preprocessing stage and the vertex link of the quad edge data structure and performing the splice operation on the candidate edge and new quad edge.

* * * * *